United States Patent [19]
Takada

[11] 3,869,145
[45] Mar. 4, 1975

[54] SELF-APPLYING VEHICLE SAFETY BELT
[75] Inventor: Takezo Takada, Hikone, Japan
[73] Assignee: Takata Kojyo Co. Ltd., Tokyo, Japan
[22] Filed: Aug. 13, 1973
[21] Appl. No.: 388,000

[30] Foreign Application Priority Data
Aug. 23, 1972 Japan .............................. 47-83698

[52] U.S. Cl. ....... 280/150 AB, 280/150 SB, 297/388
[51] Int. Cl. .......................................... B60r 21/10
[58] Field of Search ......... 180/82 C; 280/150 AB, 280/150 SB; 297/385, 386, 387, 388, 389

[56] References Cited
UNITED STATES PATENTS
| | | | |
|---|---|---|---|
| 3,146,460 | 9/1964 | Henderson | 280/150 AB |
| 3,300,910 | 1/1967 | Isaac | 280/150 SB |
| 3,314,719 | 4/1967 | Johnson | 280/150 SB |
| 3,348,881 | 10/1967 | Weman | 280/150 SB |
| 3,391,961 | 7/1968 | Gardner et al. | 280/150 SB |
| 3,414,326 | 12/1968 | Raffaelli | 297/385 |
| 3,623,768 | 8/1970 | Capener | 280/150 SB |
| 3,758,044 | 9/1973 | Nilsson | 280/150 SB |

Primary Examiner—M. Henson Wood, Jr.
Assistant Examiner—Robert Saifer
Attorney, Agent, or Firm—Wolder & Gross

[57] ABSTRACT

A self applying three point automatically inflatable vehicle safety lap and shoulder belt includes inflatable fibrous lap and shoulder belts joined at one end to a coupling ring and at their other ends to inertia locked spring biased retraction reels. The lap belt is premolded to a semi-circular inflated shape mating the seat occupant's laps and the belts communicate through a common tube and a solenoid actuated valve system alternatively to a compressed air source to inflate and extend the belts and to exhaust. A coupling is provided which automatically locks the ring upon engagement thereof. A network automatically connects the belt the compressed air source upon occupation of the seat and then deflates the coupled belt and upon actuation of an inertia switch locks the reels against withdrawal and inflates the belts and a door opening or hand actuated switch exhausts the belts and releases the ring.

9 Claims, 11 Drawing Figures

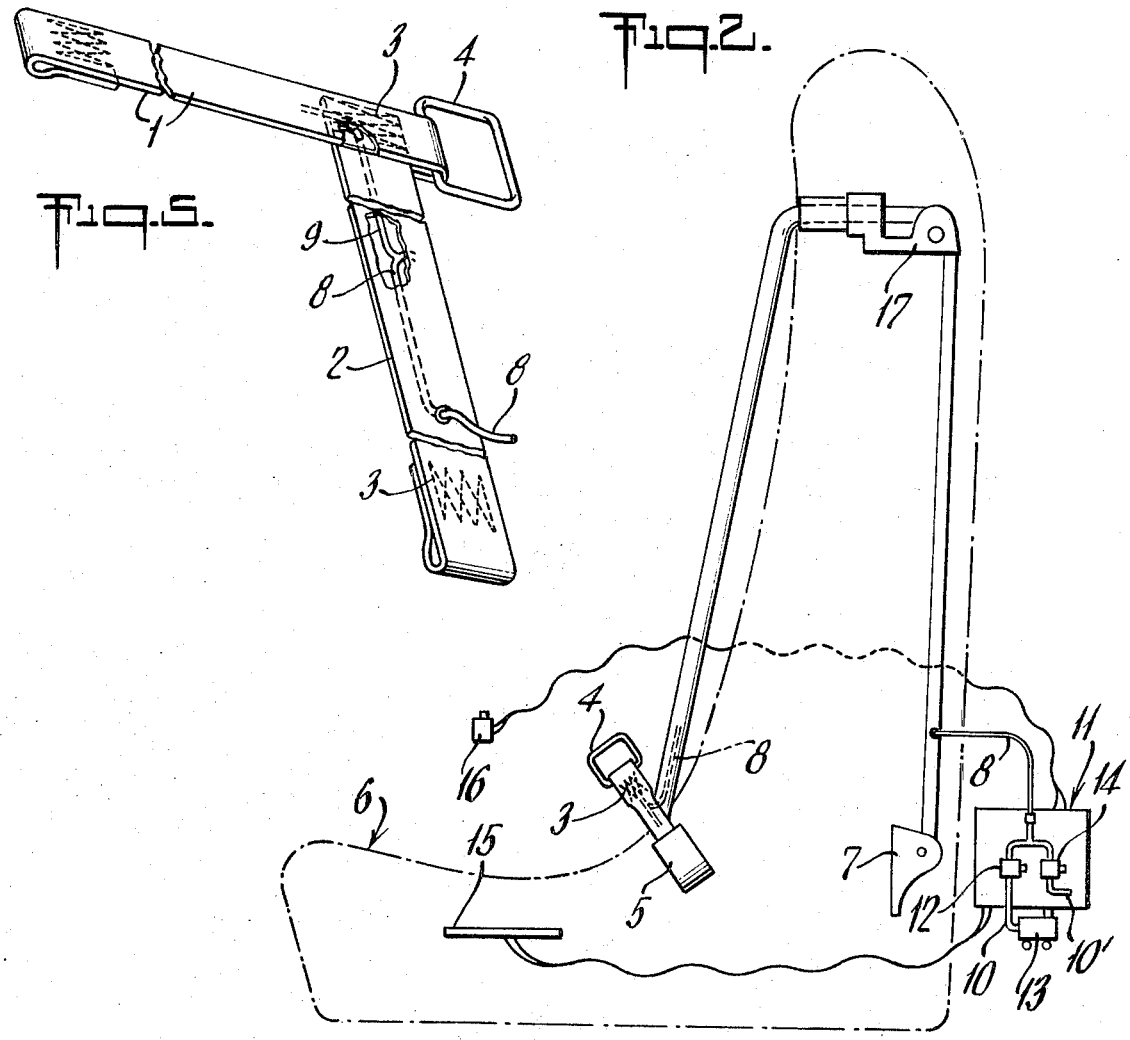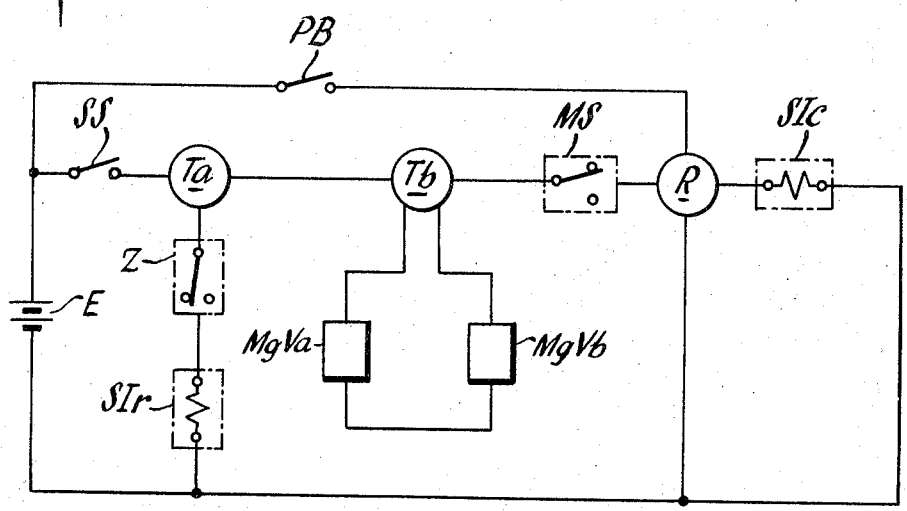

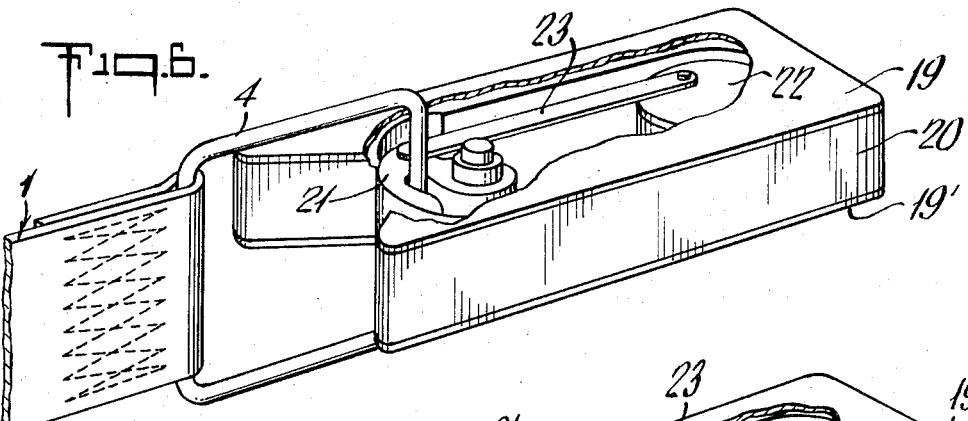
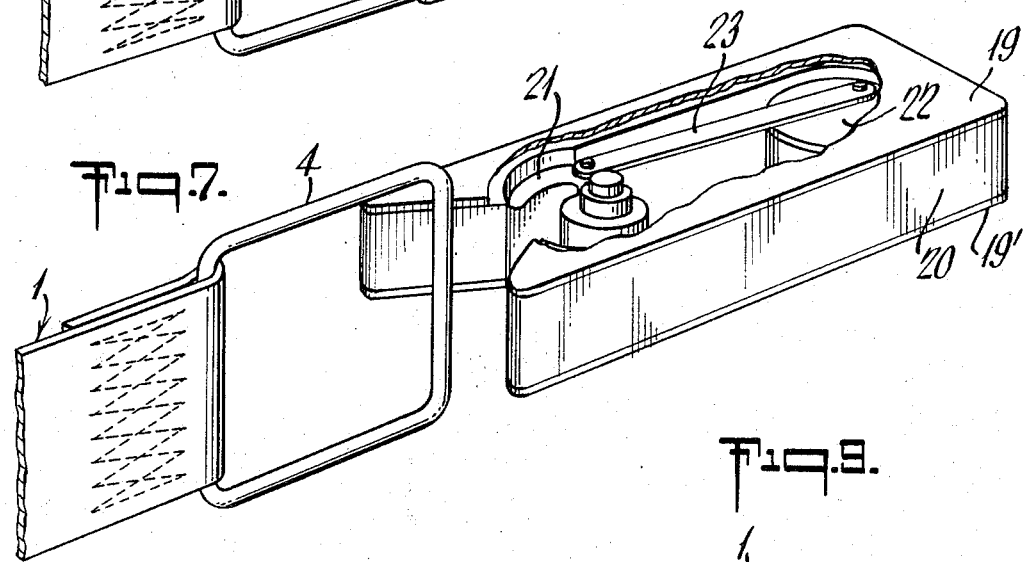
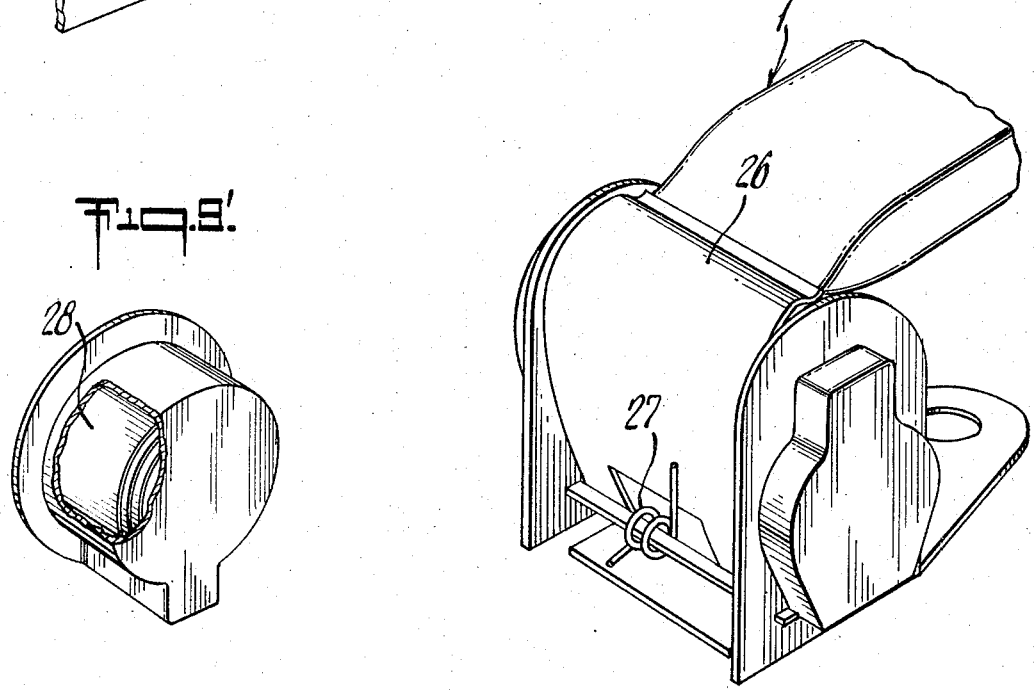

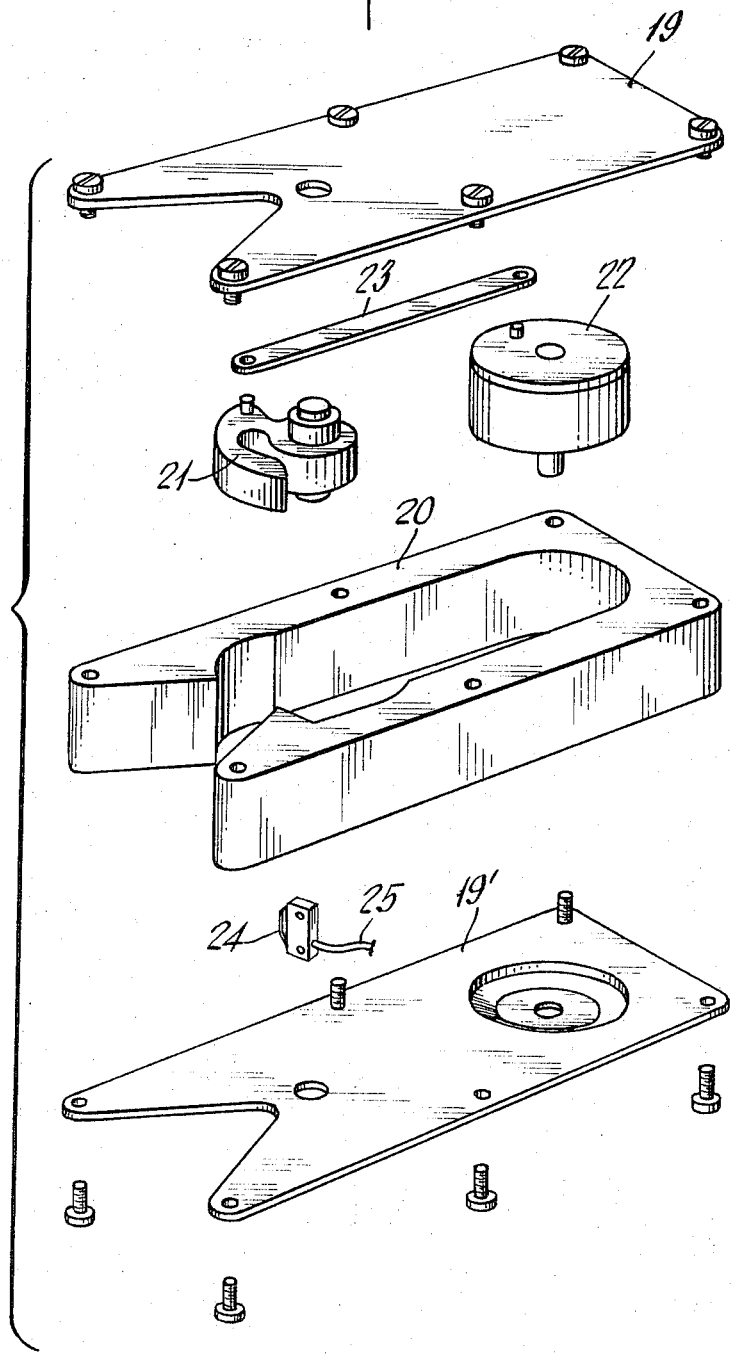

SELF-APPLYING VEHICLE SAFETY BELT

BACKGROUND OF THE INVENTION

The present invention relates generally to improvements to vehicle safety devices and it relates more particularly to an improved automatic self applying and inflatable vehicle safety belts.

A general safety requirement in automobiles and other vehicles is the provision of safety belts to retain an occupant in a seat in the event of an accident in order to prevent or minimize any personal injuries. A conventional safety belt structure which is widely employed is the three point safety belt in which the free ends of a lap and shoulder belt which extend from retraction reels are joined and are concurrently buckled. These belt systems, as well as other safety belt systems as commonly employed possess numerous drawbacks and disadvantages. While such belt systems afford some degree of protection when used, there is no compulsion to buckle the belts and they do not provide any protection unless they are properly buckled. Various systems have been proposed and employed which provide a warning or prevent the start up of the engine in the event that the belt of an occupied seat is not properly buckled, but such systems are easily by passed. Other systems have been proposed in which the belt automatically engages the seat occupant upon his sitting in the seat, but these have generally been highly complex and otherwise leave much to be desired.

SUMMARY OF THE INVENTION

It is a principal object of the present invention to provide an improved vehicle safety device.

Another object of the present invention is to provide an improved automobile safety belt system.

Still another object of the present invention is to provide an improved automatically inflatable safety belt.

A further object of the present invention is to provide an improved automatically self applying automobile safety belt.

Still a further object of the present invention is to provide a vehicle safety belt system of the above nature characterized by its reliability, ruggedness, simplicity, convenience and comfort and great versatility and adaptability.

The above and other objects of the present invention will become apparent from a reading of the following description taken in conjunction with the accompanying drawings which illustrate a preferred embodiment thereof.

In a sense, the present invention contemplates the provision of a vehicle safety belt system including a collapsible arcuately preformed inflatable lap belt associated with a vehicle seat and extendable upon inflation from a first side to an opposite second side of the seat, a source of compressed air, a coupling member located on the seat second side and releasably engaging and locking the free end of the belt when brought into engagement therewith, valve means responsive to the occupation of the seat for initially effecting communication between said belt and the compressed air source to inflate and extend the belt to the coupling member and then effecting communication between the belt and exhaust to deflate the belt. Advantageously, the belt extends from an inertia locked retraction reel, and an inflatable shoulder belt is joined to the lap belt in a three point system. The lap belt communicates through a tube in the shoulder belt which likewise communicates with the shoulder belt to the valve system and a mechanism is also provided for automatically effecting inflation of the belts by the compressed air source in the event of rapid change in velocity of the vehicle.

The improved system is highly reliable, rugged, dependable, convenient, comfortable and versatile.

BRIEF DESCRIPTION OF THE DRAWINGS

FIG. 2 is a side elevational view thereof in a seat unoccupied condition;

FIG. 5 is a perspective fragmentary view of the belt assembly per se;

FIG. 6 is a perspective view of the belt coupling device shown in a locked condition;

FIG. 7 is a view similar to FIG. 6 shown in unlocked condition;

FIG. 8 is an exploded perspective view of the belt coupling device;

FIG. 9 is a perspective view of the lap belt take up reel;

FIG. 9' is a perspective view, partially broken away, of the reel rewind spring; and FIG. 10 is a schematic view of the belt operation control network.

DESCRIPTION OF THE PREFERRED EMBODIMENT

Figure 1:
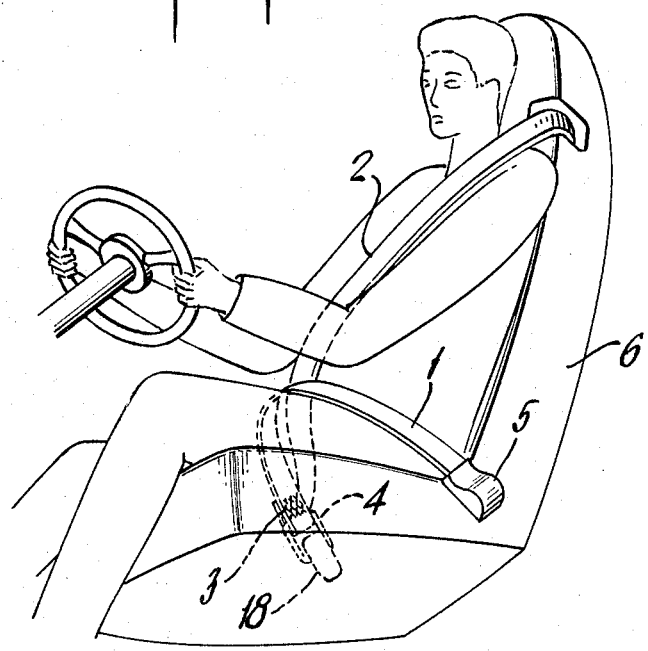
FIG. 1 is a side perspective view of a preferred embodiment of the present invention showing the belt in a buckled condition restraining a seat occupant.
Figure 3:
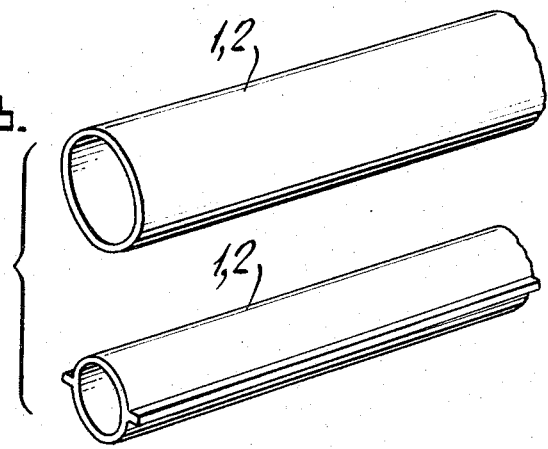
FIG. 3 is an elevational view of a section of belt in inflated and partially inflated conditions.
Figure 4:
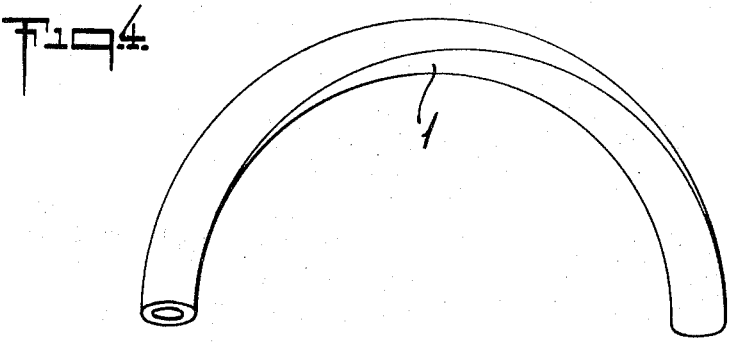
FIG. 4 is a perspective view of the extended inflated premolded lap belt.

Referring now to the drawings which illustrate a preferred embodiment of the present invention, the reference numeral 1 generally designates a safety lap belt and reference numeral 2 a shoulder belt which are associated in a three point safety belt system by joining the belts proximate their corresponding free ends, such as by sewing as at 3. The belts 1 and 2 are of tubular inflatable construction which are collapsible and highly flexible and may be woven, knitted, or otherwise formed of synthetic resins or fibers and suitably treated. A square coupling ring 4 is attached to the end of lap belt 1 by a loop formed at the end of the belt. As shown in FIG. 4, the lap belt 1 is molded or preformed in the shape of a torus or equiradial arc having an inside face which matches the lap of the occupant and being of different thicknesses along the inside and outside. The belt 1 is collapsible and windable on a reel and and assumes a toroid shape as it is inflated.

The end of lap belt 1 opposite ring 4 is wound in a spring biased take-up reel 5 located on a first side of an associated vehicle seat 6 and the corresponding end of the shoulder belt 2 is wound on a spring biased take-up reel 7, and the shoulder belt 2 extends upwardly from reel 7 over an upper guide roll device 17 and to the lap belt 1. The reels 5 and 7 are of a known type which are provided with solenoid actuated reel locking means and from which the belts may be freely withdrawn to wind take-up spiral springs 28 which bias the take-up reel and which are controlled by inertia switches to lock the reels against belt withdrawal.

A fine flexible tube 8 which may be formed of a synthetic resin extends along the length of and within shoulder belt 2 projecting therefrom proximate the reel 7 and extending into lap belt 2 at the junction of belts 1 and 2 and communicating with the interiors of belts 1 and 2. The end of tube 8 projecting from belt 2 being connected to the inputs of respective solenoid operated valves 12 and 14. The outlet of valve 14 is connected to exhaust to the atmosphere and the outlet of valve 12 is connected to a source 13 of compressed air, for example, an air pressurized reservoir tank which is connected to an air compressor which is driven by the vehicle engine fan belt. The inflation, deflation device 11, including valves 12 and 14 are controlled by any suitable network, including a switch 15 actuated by occupation of the seat 6, a manually operated or door opening operated switch 16 and an inertia switch. The switches and device 11 are so related that upon occupation of seat 6 and the consequent actuation of switch 15, the valve 12 is open for a predetermined interval to inflate the belts and is then closed and valve 14 opened to exhaust and deflate the belts. Moreover, the actuation of the inertia switch functions not only to lock reels 5 and 7, but also to open valve 12, valve 14 being closed, to inflate the belts 1 and 2.

An automatic buckle or coupling device 18 actuated upon insertion of coupling ring 4 is anchored to the far side of seat 6 and includes a U-shaped main frame 20 having inwardly converging end faces and sandwiched between a pair of upper and lower cover plates 19 and 19' having V-shaped end recesses coinciding with the open end of frame 20. A hook shaped catch or latch 21 is pivoted to swing between a retracted position exposing the buckle opening as shown in FIG. 7 and an advanced closed opening as shown in FIG. 6. A link 23 connects an eccentric pin on hook member 21 with an eccentric pin mounted on the rotary armature of a rotary solenoid 22. A microswitch 24 is located on the buckle device 18 with its actuating arm in the path of the inserted coupling ring 4 and is connected through leads 25 and solenoid 22 to the current source network so that upon insertion of ring 4 to actuate switch 22 so as to effect the actuation of solenoid 22 in a manner to close latch 21 and lock the ring 4 in the buckled coupled condition.

A curved pinch plate 26 is swingably mounted on each of the retraction reels and is biased by a spring 27 to bring the free edge of thereof to bear on the belt adjacent to the reel to tightly pinch the belt and inhibit the leaking of air from the associated belt.

Considering the operation of the system described above, as a person sits down on the seat 6, the seat switch 15 is actuated whereby to effect the operation of the control device 11 and the compressed air from the source 13, whereby to open the solenoid valve 12, so that the compressed air flows into the lap belt 1 through the tube 8. Even where the lap belt 1 is fully inflated with compressed air, the lap belt 1 is pinch closed proximate the reel 5 due to the action of the pinch plate 26, in order to prevent the leakage of compressed air from belt 1. Hence the lap belt 1 extends gradually in the direction of the buckle means 18 along the path of the semi-circular arc which has been molded into the lap belt 1 to fit to the front area of the chest of the person occupying the vehicle seat. Moreover, the shoulder belt 2 fastened to the lap belt 1, engages the upper torso of the seat occupant from the shoulder to the waist in a diagonal manner. While the ring 4 attached to the end of the lap belt 1 approaches the catch means 18, the rotary solenoid 22 is actuated simultaneously with the occupation by the rider of the seat 6 and the lock or hook member 21 of the catch means 18 is retracted. Upon engagement of the lock mechanism 18 by the ring 4, the switch 24 is opened thereby to deenergize the rotary solenoid 22 and retract the link or the connection rod 23 which advances the hook member 21 to engage ring 4 so that the lap belt 1 and the shoulder belt 2 are securely locked to the catch means 18. Furthermore, as the engagement of the locking mechanism 21 and hook 4 is completed, the microswitch 24 effects the control device 11 to operate, so as to close the compressed air solenoid valve 14 and open the exhaust solenoid valve 14 and the air in the belt is exhausted. Also when the vehicle has suddenly stopped or subjected to abnormal shock, in response to an actuated inertia switch the valve 14 is closed and valve 12 opened to inflate the belt with compressed air from source 13, so that impact to the seat occupant is mitigated. To unload the waist belt 1 and shoulder belt 2, the push button-type switch 16 operated either manually or by the opening of the door. As a consequence, the control device 11 operates to energize solenoid 22 and retract the hook member 21 to release ring 4 and the belt is released and wound automatically to the initial position due to the action of take-up winding of the spring 28 of the reel or locking devices 5, 7.

In FIG. 10, there is shown by way of example, a network for the control device 11. The person sitting down on the seat causes the switch SS to be closed to electrically energize the network. The electric current thus reaches the timer $Ta$ which is adjusted for a predetermined interval, and flows into the other circuits; the hand switch PB normally being open. The compressed air solenoid valve $MgVa$ is opened, and the pressurized air from the compressed air source flows into the belt, causing the withdrawal and extension of the belt. The inflated extended belt comes into contact with the microswitch MS, interrupting the current to the solenoid $Slc$, and the belt is locked. Due to the time control of the timer $Tb$, the compressed air valve $MgVa$ is closed, and the air-exhaust solenoid valve $MgVb$ is opened and air in the belt is exhausted. Next, when releasing the belt, the hand switch PB is closed; the parts relay R operates to the solenoid $Slc$ and releases the locking of the belt. The released belt returns to the initial state due to the take-up winding effected by the springs 28 of the locking take-up reels 5 and 7. The sensor Z which is actuated when the vehicle has stopped suddenly or is subjected to abnormal shock, actuates the locking means by interrupting the current to the solenoid $Slr$ attached to the retractor.

While there have been described and illustrated a preferred embodiment of the present invention, it is apparent that numerous alterations, omissions and additions may be made without departing from the spirit thereof.

I claim:

1. A vehicle safety belt system for use with a vehicle seat comprising an inflatable flexible tubular lap belt preformed to assume a longitudinally arcuate shape upon inflation thereof, said belt having a first end anchored to a first side of said seat, a coupling member secured to the second end of said belt opposite to said first end, a coupling device positioned at a second side of said seat opposite said first side for releasably engaging said coupling member, a source of compressed air, and control means responsive to the occupation of said seat for connecting the interior of said belt to said compressed air source to inflate and extend said belt from said seat first side to said coupling device and thereafter connecting the interior of said belt to exhaust in response to said belt extending to said coupling device.

2. The system of claim 1 comprising a tubular inflatable shoudler belt having an anchored rear section and a front end secured to said lap belt proximate its second end, said connecting means comprising a tube extending from said compressed air source through said shoulder belt to said lap belt.

3. The system of claim 2 wherein said tube communicates with the interior of said shoulder belt.

4. The system of claim 1 including a retraction reel located at said seat first side, said lap belt be wound on and withdrawable from said reel.

5. The system of claim 4, including means responsive to a predetermined change in the velocity of said vehicle for locking said reel against belt withdrawal.

6. The system of claim 1 including means responsive to a predetermined change in the velocity of said vehicle for effecting communication between said lap belt and source of compressed air.

7. The system of claim 1 wherein said coupling device comprises a latch member moveable between a coupling member lock and unlock position and means responsive to said coupling member registering with said coupling device for shifting said latch to said lock position.

8. The system of claim 4, including means for pinching said lap belt proximate said reel.

9. An air belt passive locking protection device, comprising tubular seat belts having warp or weft core of synthetic resin or fiber held at the side or rear of the seat, wherein a compressed air source including an electromagnet valve is operated by the command of a control device which works responsive to the taking of a seat of the occupant or abnormal condition of the vehicle, the compressed air is supplied through the tube inserted in the shoulder belt into the inside of at least one of said belts, the lap belt is expanded in a semicircular shape, a catch means provided on the opposite side of the seat engages with the hook attached to the end of the belt, then the air supplied to the belt is shut off by the control device, and then the air in the belt is exhausted by means of said electromagnetic valve to lock the body of the occupant, and when the vehicle has been stopped suddenly or abnormal condition has occurred on the vehicle, the compressed air source is operated by the command of the control device and air is blown into the insides of the belt, in order to decrease the impact to be applied to the occupant.

* * * * *